(12) United States Patent
Schroeder et al.

(10) Patent No.: US 6,465,602 B2
(45) Date of Patent: Oct. 15, 2002

(54) MODIFIED CONDENSATION POLYMERS HAVING AZETIDINIUM GROUPS AND CONTAINING POLYSILOXANE MOIETIES

(75) Inventors: Wen Zyo Schroeder, Neenah, WI (US); Daniel Arthur Clarahan, Greenleaf, WI (US); Mike Thomas Goulet, Neenah, WI (US); Thomas Gerard Shannon, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/778,412

(22) Filed: Feb. 7, 2001

(65) Prior Publication Data

US 2002/0053412 A1 May 9, 2002

Related U.S. Application Data

(62) Division of application No. 09/488,383, filed on Jan. 20, 2000, now Pat. No. 6,235,155.

(51) Int. Cl.$^7$ ............................................... C08G 69/26
(52) U.S. Cl. .................... 528/332; 528/335; 162/164.4; 162/168.1; 162/111; 162/112; 162/158; 428/447; 536/58; 536/84; 536/103; 525/438; 525/540; 106/287; 424/400; 424/401
(58) Field of Search ................................. 162/111, 112, 162/158, 164.4, 168.1, 168.3, 168.2, 183, 178; 428/447, 364, 391; 536/58, 84, 103, 107, 112, 114; 528/271, 288, 332, 335; 525/438, 540

(56) References Cited

U.S. PATENT DOCUMENTS

| | | |
|---|---|---|
| 2,661,349 A | 12/1953 | Caldwell et al. |
| 2,876,217 A | 3/1959 | Paschall |
| 2,926,116 A | 2/1960 | Keim |
| 2,926,154 A | 2/1960 | Keim |
| 2,995,513 A | 8/1961 | Paschall et al. |
| 3,128,311 A | 4/1964 | Shirley et al. |
| 3,152,998 A | 10/1964 | Moss |
| 3,155,728 A | 11/1964 | Lesesne |
| 3,236,792 A | 2/1966 | Curtis |
| 3,236,895 A | 2/1966 | Lee et al. |
| 3,240,721 A | 3/1966 | Fordyce |
| 3,250,664 A | 5/1966 | Conte et al. |
| 3,347,926 A | 10/1967 | Zech |
| 3,434,984 A | 3/1969 | Hyland, Jr. |
| 3,436,359 A | 4/1969 | Hubin et al. |
| 3,438,970 A | 4/1969 | Chamberlain et al. |
| 3,449,886 A | 6/1969 | Connelly et al. |
| 3,511,830 A | 5/1970 | Speakman |
| 3,513,156 A | 5/1970 | Speakman |
| 3,609,126 A | 9/1971 | Asao et al. |
| 3,620,913 A | 11/1971 | Parmerter |
| 3,649,624 A | 3/1972 | Powers et al. |
| 3,654,370 A | 4/1972 | Yeakey |
| 3,770,472 A | 11/1973 | Jarowenko |
| 3,793,279 A | 2/1974 | Lipowski |
| 3,893,885 A | 7/1975 | Ziemann et al. |
| 3,940,519 A | 2/1976 | Helmer et al. |
| 4,014,933 A | 3/1977 | Boettger et al. |
| 4,066,495 A | 1/1978 | Voigt et al. |
| 4,153,581 A | 5/1979 | Habermann |
| RE30,193 E | 1/1980 | O'Shaughnessy |
| 4,267,059 A | 5/1981 | Behn et al. |
| 4,278,573 A | 7/1981 | Tessler |
| 4,447,498 A | 5/1984 | Fink et al. |
| 4,450,045 A | 5/1984 | Hertel et al. |
| 4,521,490 A | 6/1985 | Pocius et al. |
| 4,741,804 A | 5/1988 | Solarek et al. |
| 4,764,418 A | 8/1988 | Kuenn et al. |
| 4,766,245 A | 8/1988 | Larkin et al. |

(List continued on next page.)

FOREIGN PATENT DOCUMENTS

| | | |
|---|---|---|
| DE | 2 247 943 | 4/1973 |
| EP | 0 620 315 A1 | 10/1994 |
| EP | 0 761 691 A2 | 3/1997 |
| WO | WO 99/12977 A1 | 3/1999 |

OTHER PUBLICATIONS

Derwent World Patent Database abstract of SU 451,731: Description of Vladimir Synth Resi, "Cyanoethylated Starch Adhesive for Electroluminescent Lamps".
Burr, R.C., et al., "Starch Graft Copolymers for Water Treatment," *Die Starke*, 27, Nr. 5, 1975, pp. 155–159.
Cheng, W.C., et al., "O–Carboxymethylstarch Amine Polyampholytes as Papermaking Additives," *Starch/Stärke*, vol. 30, No. 8, Aug. 1978, pp. 280–282.
Farewell, John, Editor, *Commercially Available Chemical Agents for Paper and Paperboard Manufacture*, Fourth Edition, Tappi Press, 1990, pp. 5–6.
Hamerstrand, G.E., et al., "An Evaluation of Cationic Aminoethyl Cereal Flours as Wet–End Paper Additives," *Tappi*, vol. 58, No. 1, Jan. 1975, pp. 112–115.
Heath, H.D., et al., "Flocculating Agent–Starch Blends for Interfiber Bonding and Filler Retention: Comparative Performance With Cationic Starches," *Tappi*, vol. 57, No. 11, Nov. 1974, pp. 109–111.
Lindsay, William F., "Absorbent Starch Based Co–polymers—Their Characteristics and Applications," *Formed Fabrics Industry*, 8(5), 1977, pp. 20, 24, 26.
Van Beynum, G.M.A., editor, *Starch Conversion Technology*, Marcel Dekker, Inc., New York, 1985, pp. 92–93.

*Primary Examiner*—Steven P. Griffin
*Assistant Examiner*—Mark Halpern
(74) *Attorney, Agent, or Firm*—Gregory E. Croft (57) ABSTRACT

Condensation polymers, such as polyamide epichlorohydrin (PAE) resins, can be combined with polysiloxanes in a single molecule to provide several potential benefits, depending upon the specific combination employed, including: (a) wet strength resins that soften; (b) softeners that do not reduce dry or wet tensile strength; (c) wet strength with improved wet/dry tensile ratio; (d) softeners/debonders with reduced linting and sloughing; (e) wet strength aids with controlled absorbency rate; and (f) Yankee dryer additives that provide surface protection and adhesion with controlled release properties.

8 Claims, No Drawings

U.S. PATENT DOCUMENTS

| | | |
|---|---|---|
| 4,801,699 A | 1/1989 | Jobe et al. |
| 4,824,689 A | 4/1989 | Kuenn et al. |
| 4,866,151 A | 9/1989 | Tsai et al. |
| 4,959,125 A | 9/1990 | Spendel |
| 4,973,680 A | 11/1990 | Billmers |
| 4,983,748 A | 1/1991 | Tsai et al. |
| 5,174,927 A | 12/1992 | Honsa |
| 5,518,585 A | 5/1996 | Huth et al. |
| 5,525,345 A | 6/1996 | Warner et al. |
| 5,552,020 A | 9/1996 | Smith et al. |
| 5,575,891 A | 11/1996 | Trokhan et al. |
| 5,578,678 A | 11/1996 | Hartmann et al. |
| 5,591,306 A | 1/1997 | Kaun |
| 5,612,443 A | 3/1997 | Martino et al. |
| 5,624,532 A | 4/1997 | Trokhan et al. |
| 5,626,719 A | 5/1997 | Tansley et al. |
| 5,656,746 A | 8/1997 | Smith et al. |
| 5,354,425 A | 10/1997 | Mackey et al. |
| 5,716,692 A | 2/1998 | Warner et al. |
| 5,746,887 A | 5/1998 | Wendt et al. |
| 5,770,711 A | 6/1998 | Greene et al. |
| 5,772,845 A | 6/1998 | Farrington, Jr. et al. |
| 5,785,813 A | 7/1998 | Smith et al. |
| 5,856,299 A | 1/1999 | Righetto et al. |
| 5,958,187 A | 9/1999 | Bhat et al. |
| 6,059,928 A | 5/2000 | Van Luu et al. |
| 6,090,242 A | 7/2000 | Drummond et al. |
| 6,126,784 A | 10/2000 | Ficke et al. |
| 6,153,053 A | 11/2000 | Harper et al. |
| 6,190,678 B1 | 2/2001 | Hasenoehrl et al. |
| 6,193,843 B1 | 2/2001 | Tsai et al. |
| 6,204,254 B1 | 3/2001 | Nelson et al. |
| 6,207,012 B1 | 3/2001 | Oriaran et al. |
| 6,207,013 B1 | 3/2001 | Oriaran et al. |
| 6,235,155 B1 | 5/2001 | Schroeder et al. |

MODIFIED CONDENSATION POLYMERS HAVING AZETIDINIUM GROUPS AND CONTAINING POLYSILOXANE MOIETIES

This application is a divisional of U.S. Pat. No. 6,235,155 entitled "MODIFIED CONDENSATION POLYMERS HAVING AZETIDINIUM GROUPS AND CONTAINING POLYSILOXANE MOIETIES" filed in the U.S. Patent and Trademark Office on Jan. 20, 2000, which claims priority from U.S. Ser. No. 60/117,164 filed Jan. 25, 1999. The entirety of U.S. Pat. No. 6,235,155 is hereby incorporated by reference.

BACKGROUND OF THE INVENTION

In the manufacture of paper products, such as facial tissue, bath tissue, paper towels, dinner napkins and the like, a wide variety of product properties are imparted to the final product through the use of chemical additives. Examples of such additives include softeners, debonders, wet strength agents, dry strength agents, sizing agents, opacifiers and the like. In many instances, more than one chemical additive is added to the product at some point in the manufacturing process. Unfortunately, there are instances where certain chemical additives may not be compatible with each other or may be detrimental to the efficiency of the papermaking process, such as can be the case with the effect of wet end chemicals on the downstream efficiency of creping adhesives. Another limitation, which is associated with wet end chemical addition, is the limited availability of adequate bonding sites on the papermaking fibers to which the chemicals can attach themselves. Under such circumstances, more than one chemical functionality compete for the limited available bonding sites, oftentimes resulting in the insufficient retention of one or both chemicals on the fibers.

Therefore, there is a need for a means of applying more than one chemical functionality to a paper web which mitigates the limitations created by limited number of bonding sites.

SUMMARY OF THE INVENTION

In certain instances, two or more chemical functionalities can be combined into a single molecule, such that the combined molecule imparts at least two distinct product properties to the final paper product that heretofore have been imparted through the use of two or more different molecules. More specifically, polyamide epichlorohydrin (PAE) resins can be combined with polysiloxanes in a single molecule to provide several potential benefits, depending upon the specific combination employed, including: (a) wet strength resins that soften; (b) softeners that do not reduce dry or wet tensile strength; (c) wet strength with improved wet/dry tensile ratio; (d) softeners/debonders with reduced linting and sloughing; (e) wet strength aids with controlled absorbency rate; and (f) Yankee dryer additives that provide surface protection and adhesion with controlled release properties.

Hence in one aspect, the invention resides in a condensation polymer having the following structure:

where $w \geq 1$ $q \geq 0$ $m \geq 1$ $n \geq 1$ $p \geq 0$

$Z_1$, $Z_2$, $Z_3$=bridging radicals, which may be the same or different and which serve to incorporate the $R_1$, $R_2$, and $R_3$ groups into the polymer;

$R_1$=a monomer unit or a block or graft copolymer containing a siloxane functionality and of the form —O—Si(R')$_2$—O—[Si(R'')$_2$—O]$_n$—Si(R''')$_3$ where R', R'', R''' can be the same or different and are selected from the group consisting of: H, OH and aryl or alkyl or aliphatic hydrocarbon, $C_{1-40}$, linear or branched, saturated or unsaturated, substituted or non-substituted, with or without ethyoxylation and/or propoxylation;

$R_2$=any linear or branched, saturated or unsaturated, substituted or non-substituted aliphatic hydrocarbon containing at least one secondary amine group;

$R_3$=any linear or branched, saturated or unsaturated, substituted or non-substituted aliphatic hydrocarbon of chain length 2 or higher.

In another aspect, the invention resides in a paper sheet, such as a tissue or towel sheet, comprising an amount of a condensation polymer having the following structure:

where $w \geq 1$ $q \geq 0$ $m \geq 1$ $n \geq 1$ $p \geq 0$

$Z_1$, $Z_2$, $Z_3$=bridging radicals, which may be the same or different and which serve to incorporate the $R_1$, $R_2$, and $R_3$ groups into the polymer;

$R_1$=a monomer unit or a block or graft copolymer containing a siloxane functionality and of the form —O—Si(R')$_2$—O—[Si(R'')$_2$—O]$_n$—Si(R''')$_3$ where R', R'', R''' can be the same or different and are selected from the group consisting of: H, OH and aryl or alkyl or aliphatic hydrocarbon, $C_{1-40}$, linear or branched, saturated or unsaturated, substituted or non-substituted, with or without ethyoxylation and/or propoxylation;

$R_2$=any linear or branched, saturated or unsaturated, substituted or non-substituted aliphatic hydrocarbon containing at least one secondary amine group;

$R_3$=any linear or branched, saturated or unsaturated, substituted or non-substituted aliphatic hydrocarbon of chain length 2 or higher.

In another aspect, the invention resides in a method of making a paper sheet such as a tissue or towel sheet, comprising the steps of: (a) forming an aqueous suspension of papermaking fibers; (b) depositing the aqueous suspension of papermaking fibers onto a forming fabric to form a web; and (c) dewatering and drying the web to form a paper sheet, wherein a condensation polymer is added to the aqueous suspension, said condensation polymer having the following structure:

where
- $w \geq 1$
- $q \geq 0$
- $m \geq 1$
- $n \geq 1$
- $p \geq 0$
- $Z_1$, $Z_2$, $Z_3$=bridging radicals, which may be the same or different and which serve to incorporate the $R_1$, $R_2$, and $R_3$ groups into the polymer;
- $R_1$=a monomer unit or a block or graft copolymer containing a siloxane functionality and of the form —O—Si(R')$_2$—O—[Si(R")$_2$—O]$_n$—Si(R'")$_3$ where R', R", R'" can be the same or different and are selected from the group consisting of: H, OH and aryl or alkyl or aliphatic hydrocarbon, $C_{1-40}$, linear or branched, saturated or unsaturated, substituted or non-substituted, with or without ethyoxylation and/or propoxylation;
- $R_2$=any linear or branched, saturated or unsaturated, substituted or non-substituted aliphatic hydrocarbon containing at least one secondary amine group;
- $R_3$=any linear or branched, saturated or unsaturated, substituted or non-substituted aliphatic hydrocarbon of chain length 2 or higher.

The amount of the condensation polymer of this invention added to the fibers can be from about 0.01 to about 2 weight percent, on a dry fiber basis, more specifically from about 0.02 to about 1.5 weight percent, and still more specifically from about 0.05 to about 1.0 weight percent. The modified condensation polymer(s) can be added to the fibers at any point in the process, particularly including the wet end of the process where the fibers are suspended in water. However, these polymers can also be added to the web during or after drying, such as during creping.

Methods of making paper products which can benefit from the various aspects of this invention are well known to those skilled in the papermaking art. Exemplary patents include U.S. Pat. No. 5,785,813 issued Jul. 28, 1998 to Smith et al. entitled "Method of Treating a Papermaking Furnish For Making Soft Tissue"; U.S. Pat. No. 5,772,845 issued Jun. 30, 1998 to Farrington, Jr. et al. entitled "Soft Tissue"; U.S. Pat. No. 5,746,887 issued May 5, 1998 to Wendt et al. entitled "Method of Making Soft Tissue Products"; and U.S. Pat. No. 5,591,306 issued Jan. 7, 1997 to Kaun entitled "Method For Making Soft Tissue Using Cationic Silicones", all of which are hereby incorporated by reference.

DETAILED DESCRIPTION OF THE INVENTION

In order to further describe the invention, examples of the synthesis of some of the various chemical species are described below.

Polyamide Epichlorohydrin Resins

Functionalized polyamide epichlorohydrin resins are commonly used in the paper industry as alkaline curing wet strength resins. As a result of the cross-linking that occurs during the curing reaction, covalent bonds are formed between polymers and fibers and between polymer molecules themselves. As a result the dry tensile will also be improved and the tendency for linting and sloughing will be reduced. In addition to use as a wet strength resin for tissue products, PAE resins are also often employed as a component in Yankee dryer creping adhesives. The cross-linking feature provides protection to the Yankee surface while at the same time promoting adhesion of the sheet to the dryer surface.

Figure 1:
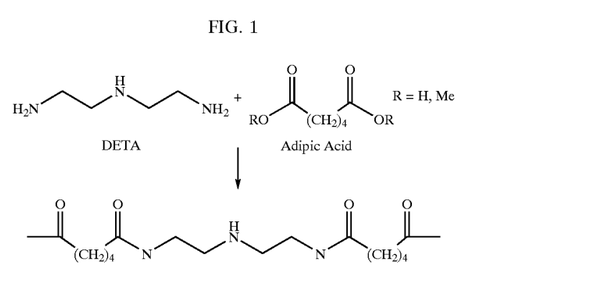

A multistep synthesis is used to prepare these resins. For the primary commercial method, in the first step a dibasic acid is condensed with a compound containing two primary amine groups to form a polyamide. The amine compound must also contain a third amine functionality, a secondary amine group. Commercially, diethylenetriamine (DETA) is the amine of choice with adipic acid the preferred dibasic acid. The resultant polyamides containing secondary amine groups are referred to as polyamidoamines. An example of a the polyamidoamine synthesis is shown in FIG. 1.

FIG. 1

Figure 2:
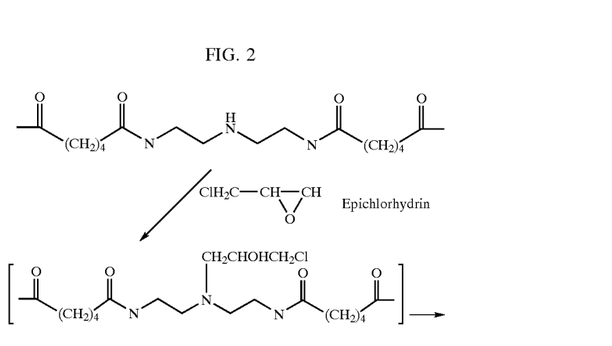

In the second stage of the synthesis, the secondary amine groups are alkylated for example by reaction with epichlorohydrin to produce tertiary aminochlorhydrin groups. These groups self-cyclize to form 3-hydroxyazetidinium groups. These 3-hydroxyazetidinium groups are responsible for the cationic character of the resins as well as providing the ability of these materials to react as wet strength resins. The resins may also be used as retention aids. Other reactions of the secondary amine group to attach functional groups capable of covalent bonding are known in the art. Most common are derivatization to give epoxy or silanol functional groups. High Mw and charge densities can be obtained. For wet strength resins molecular weights of less than 100,000 are generally employed. FIG. 2 details the reaction with epichlorohydrin.

FIG. 2

-continued

Typically only a portion of the secondary amine groups are functionalized with the crosslinking moiety. Commonly 10–50% of the secondary amine groups have been functionalized.

PAE resins undergo at least two types of reactions that contribute to wet strength. One reaction involves the reaction of an azetidinium group in one molecule with an unreacted secondary amine group in another molecule to produce a cross-link between the two molecules. In the second reaction at least two azetidinium groups on a single resin molecule react with carboxyl groups on two different fibers to produce an interfiber cross-link. It is also known to utilize promoters such as carboxymethyl cellulose to enhance the performance of these materials in paper products.

PAE resins are stabilized by acidification to a pH of 3.5–6.0 at the end of the polymerization reaction. They are generally shipped as aqueous solutions of 12–33% solids. PAE resins are thermosets and they will polymerize with themselves to water insoluble materials by action of heat alone.

In papermaking systems typical addition levels are on the order of 0.25% to 0.75%. They are effective when employed across a pH range of 5–9 although most effective in the 6–8 pH range. Other factors which affect the performance of PAE resins include: fiber anionic sites; pulp consistency; contact time; resin concentration; pulp refining; chlorine residuals; pH; stock temperature; and anionic contaminants.

Ionized carboxyl sites on the cellulose provide anionic adsorption sites for the resin molecules. The higher the carboxyl content of the cellulose the more rapidly and more extensively will a pulp retain a resin molecule. Wet strength resins follow normal Langmuir adsorption behavior with the first resin added being completely adsorbed. As increasing amounts of resin are added adsorption rate declines due to saturation of the fiber anionic sites.

Both contact time and pulp consistency impact resin retention. The adsorption process is more rapid and goes to a higher level of completion at higher consistency and longer contact time. Of the two pulp consistency has the largest impact. This effect is presumed due to the polymer molecules having a shorter distance to travel before colliding with a fiber surface.

Best resin distribution is achieved when the resin solution is diluted at least 10:1 with fresh water. Fresh water is preferred because white water contains many anionic substances which can react with the resins and neutralize them.

Refining enhances the performance of PAE resins but only at high resin addition levels. A more highly refined stock will greater surface area available for adsorption and therefore higher resin capacity. At low addition levels, even lightly refined fibers have sufficient surface area to adequately absorb all the resin.

Active chlorine will react with PAE resins to reduce their effectiveness. At low pH resins are less effective due to inadequate ionization of the pulp carboxyl groups and also the secondary amine groups become protonated and can not readily participate in cross linking reactions with azetidinium groups.

PAE resins are effective over a pH range of 5–9. At pH below 5 effectiveness is decreased due to low ionization of cellulose carboxyl groups and hence less anionic sites are available for the cationic groups on the resin. Also the secondary amine groups are protonated at pH's below 5 and hence are much slower to crosslink with azetidinium groups.

In aqueous environments, exposure to high temperature can cause hydrolysis of the azetidinium groups thereby reducing their effectiveness.

Anionic trash, lignin, hemicellulose and other anionic contaminants can react with the cationic wet strength resins and interfere with their absorption onto the fiber. When high levels of interfering substances are present charge neutralizing substances such as alum may be employed prior to addition of the PAE resin. PAE resins may also react with anionic dyes to precipitate color bodies onto the fibers.

The reaction between PAE and anionic materials can be beneficial in enhancing resin retention by fibers. This is illustrated by the use of anionic carboxymethyl cellulose in conjunction with PAE resin to improve wet strength performance. In this case it is believed that the CMC and PAE resin form a weakly cationic complex called a "Symplex" that absorbs onto fiber surfaces. The CMC provides the carboxyl groups necessary to attract more PAE onto the fiber surface.

As was mentioned prior polyamide based compounds formed via condensation polymerization reaction of a diamide with a diacid serve as the foundation for the PAE resins. A requirement is that these resins have a secondary amine group attached for reaction with the epichlorohydrin or other derivatizing agent. Commercially available PAE resins are primarily formed from adipic acid and diethylenetriamine (DETA).

There is no reason that condensation polymerization reactions necessary for preparation of the PAE resins be limited to reactions between diamines and diacid derivatives (esters or free acids). There should be no restrictions on polymer type and suitable condensation polymers would include esters, carbonates, urethanes, imides, ureas and others.

Polysiloxanes

With regard to the polysiloxane component, polysiloxanes can be made using a three-step synthesis: chlorosilane synthesis, chlorosilane hydrolysis, followed by polymerization and polycondensation.

Chlorosilane Synthesis:

$$Si + RCl \rightarrow SiR'_4$$

where:

R=H, methyl or ethyl group, and

R'=Cl, H, methyl or ethyl.

This reaction is exothermic with a yield as high as 90%. A copper-based catalyst is usually used. The resulting various chloroalkylsilanes can be separated by fractionation distillation. If desired, silanes of other functionalities can be obtained via further reactions. For instance:

$$MeSiCl_2 + C_6H_5MgBr \rightarrow Me(C_6H_5)SiCl_2 + MgClBr \text{ (Phenyl-)}$$

(Grignard Reaction)

(Vinyl Derivatives)

$R_3SiCl + R'OH \xrightarrow{Alcoholysis} R_3SiOR' + HCl$ (Alkoxy Derivatives)
where
R=alkyl, aryl, or other organofunctional group.
R'=methyl, ethyl or acetoxy Chlorosilane Hydrolysis:

Dimethyldichlorosilanes undergo exothermic hydrolysis to yield disilanols which further condense to produce a variety of linear and/or cyclic oligomers:

where
n=20–50; and
m≧3

The linear and cyclic oligomers from the above hydrolysis need to be further polymerized or condensed to produce a silicone macromolecule of sufficient length.

Cyclic Polymerization

The $(R_2SiO)_n$ cyclic oligomers undergo ring opening and polymerization to form long linear chains. Polymer chain length are determined by the presence(concentration) of the chain endblocker.

$Z\ (Me_2SiO)_n + KOH \rightarrow (Me_2SiO)y + KO(Me_2SiO)_mH$ $Me_2SiOK + Me_3SiOSiMe_3 \rightarrow Me_2SiOSiMe_3 + Me_3SiOK$ wherein
m≧1
n≧3
z≧1

Copolymerization in the presence of a catalyst ($Me_4NOH$) can be carried out in the following scheme:

$R_3SiOSiR_3 + x(R_2SiO)_4 \rightarrow R_3SiO(R_2SiO)_nSiR_3$ where
R=alkyl, aryl, or other organofunctional group.
X≧1
n≧4

Linear Condensation

The linear silanol condenses to give long chain siloxanes.

where
R=alkyl, aryl, or other organofunctional group

Attached to the silicon atom are organic side chains including alkyl, aliphatic hydrocarbons, phenyl or vinyl groups. By adjusting the —SiO—chain length, the side chain functionality and the crosslinking between molecular chains, silicones form an almost infinite number of hybrid polymers. In fact, the industry has created a plethora of novel silicones to provide various end use properties such as chemical compatibility, solubility, water repellency, lubrication, foam control, releasing aid, cooling, sealing, adhesion, coating and substantivity.

Organoreactive polysiloxanes and silanes are very useful in making hybrid polymers. The following are a few examples:

Copolymerization of vinyl silanes with an organic monomer:

where
R and R' are chlorine, amine, methoxy, acetoxy, hydroxyl, vinyl, or silicone hydride functionalities
y≧1
y≧1

Grafting the silicones to an organic polymer backbone:

where
where
R and R' are chlorine, amine, methoxy, acetoxy, hydroxyl, vinyl, or silicone hydride functionalities
x≧1

Addition of silicone functionality:

$H-SiR_3+R'OH \rightarrow R_3Si-OR'+H_2$ where
R'=any organofunctional group
R=alkyl, aryl, or other organofunctional group Incorporating Polysiloxane Moieties A variety of methods and reagents can be employed to obtain suitable polymers. In general suitable polymers for this invention are of the structure shown in FIG. 3.

FIG. 3 where
w≧1
q≧1
m≧1
n≧1
p≧0

Figure 3:
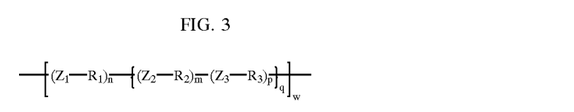

$Z_1$, $Z_2$, $Z_3$=bridging radicals including —OOC—, —COO—, —NHCO—, —OCNH—, —O—, —S—, CONHCO, —NCOO, —OSO2O—, OCOO, —OOC—Ar—O—, or any other suitable bridging radical. $Z_1$, $Z_2$, $Z_3$, $Z_4$ may be the same or different. The purpose of the $Z_1$, $Z_2$, $Z_3$, $Z_4$ radical is to serve as a mechanism for incorporating the $R_1$, $R_2$, and $R_3$ groups into the polymer. The Z groups may also contain aryl functionality.

$R_1$=Monomer or block copolymer unit containing the polysiloxane moiety, substituted or non-substituted, linear or branched.

$R_2$=any linear or branched, saturated or unsaturated, substituted or non-substituted aliphatic hydrocarbon containing at least one secondary amine group.

In addition said polymer can have a portion of its secondary amine groups reacted in such a manner as to render the polymer substantive to cellulose through one or more of the following mechanisms:
1. Intermolecular covalent bonding with cellulose
2. Intramolecular covalent bonding within the polymer molecule itself
3. Cationic charge development Preferred functional groups for covalent bonding include azetidinium, epoxy, silanol and mixtures of said groups.

$R_3$=any linear or branched, saturated or unsaturated, substituted or non-substituted aliphatic hydrocarbon.

Three methods for achieving the polymer described in FIG. 3 are: (1) direct incorporation; (2) reaction of polymer functional groups; and (3) block copolymer grafting.

Figure 4:
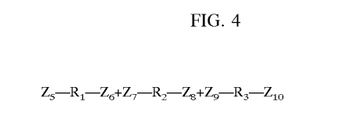

Direct Incorporation:

Such polymers as those shown in FIG. 3 can be prepared via the general reaction shown in FIG. 4. This results in direct incorporation of the aliphatic groups into the backbone in a random block pattern.

FIG. 4 where $Z_5$, $Z_6$, $Z_7$, $Z_8$, $Z_9$, $Z_{10}$=functional groups such that $Z_i$ must be capable of reacting with at least one $Z_n$ to incorporate the $R_j$ functionality into the molecule. For block copolymers only one of $Z_5$, $Z_4$ must be reactive.

$R_1$=Monomer or block copolymer unit containing the polysiloxane moiety, substituted or non-substituted, linear or branched.

$R_2$=any linear or branched, saturated or unsaturated, substituted or non-substituted aliphatic hydrocarbon containing at least one secondary amine group.

$R_3$=any linear or branched, saturated or unsaturated, substituted or non-substituted aliphatic hydrocarbon.

Suitable monomers for incorporating $R_2$ include but are not limited to the following:

$NH_2CH_2CH_2NHCH_2CH_2NH_2$
$HOOCCH_2NHCH_2COOH$
$HOCH_2CH_2NHCH_2CH_2OH$
$NH_2CH_2CH_2NHCH_2CH_2OH$
$HOOCCH_2CH_2NHCH_2CH_2COOH$
$NH_2CH_2CH_2NHCH_2CH_2NHCH_2CH_2NH$
$NH_2(CH_2)_xNH(CH_2)_yNH_2$
$HN(CH_2CH_2CN)_2$

Figure 5:
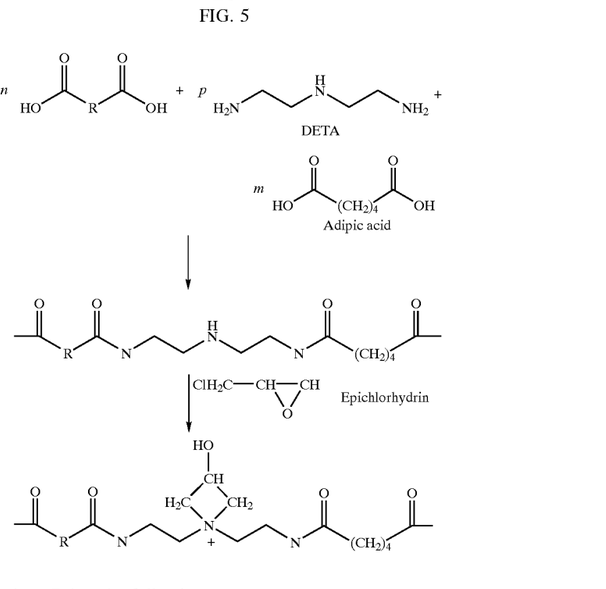
Figure 6:
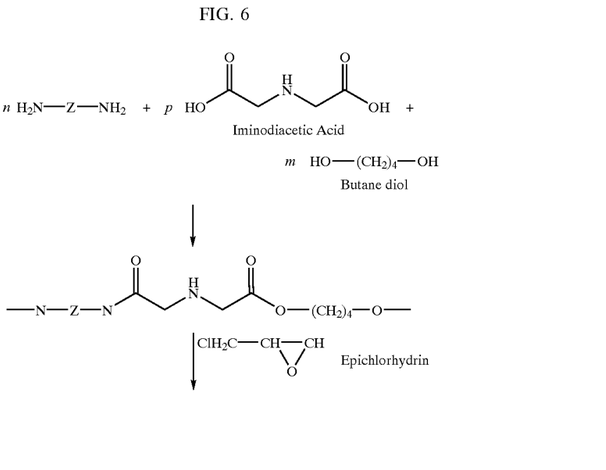

Two specific synthetic approaches are illustrated in FIGS. 5 and 6.

FIG. 5 where R has the following structure:

where
a=0–1000, and
b=1–1000

Note that only a portion of secondary amine groups need to be reacted with epichlorhydrin. Typically 10–50 mole % of the secondary amine groups will be reacted upon in such a manner.

FIG. 6

-continued where Z has the following structure:

where
a=0–1000, and
b=1–1000

Where solubility in aqueous solutions is a concern a hydrophilic monomer may also be incorporated into the backbone to counteract any hydrophobicity introduced through addition of the aliphatic hydrocarbon moieties. An example of such monomers would be the dihydroxy, dicarboxy, and diamino alkanols and polyalkanols including ethylene glycol, and polyethylene glycols of the varying monomer repeat units of the general formula:

where:
$R^1$, $R^2$=H, $CH_3$
$R^3$, $R^4$=OH, $NH_2$, $OCH_2COOH$
a, b≧0
a+b≧1

Where enhanced cationicity is desired, difunctional compounds containing tertiary amine groups may also be employed. These tertiary amine groups are capable of being quaternized via reaction with epichlorhydrin as is routinely done with cationic starches.

Reaction of Polymer Functional Groups.

The second approach to preparing azetidinium compounds containing polysiloxanes involves reaction of functional groups on the polymer with reagents containing organoreactive polysiloxanes or silanes in such a manner that the (—$SiR^1R^2$—O)— moieties are attached in a pendant fashion on the PAE resin. Such reactions may take place either prior to or after reaction with epichlorohydrin. In general the reactive reagents will be of the structure of FIG. 7.

Figure 7:
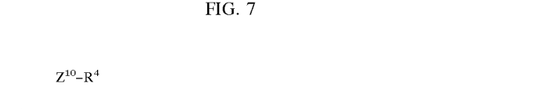

FIG. 7

$$Z^{10}\text{-}R^4$$

where

$R_4$=polysiloxanes, linear or cyclic, substituted or unsubstituted.

$Z_{10}$=any endgroup capable of reacting with functional groups on the polymer backbone. Included in this list, but not limited to would be —COOH, COCl, —COOOC—, —OCOCl, —NCO, NCS, —OH, —$NH_2$.

Figure 8:
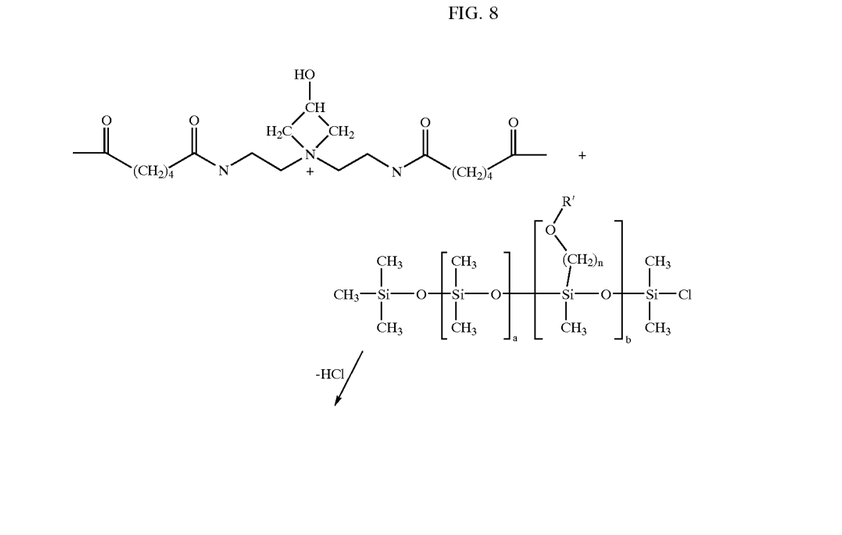
Figure 9:
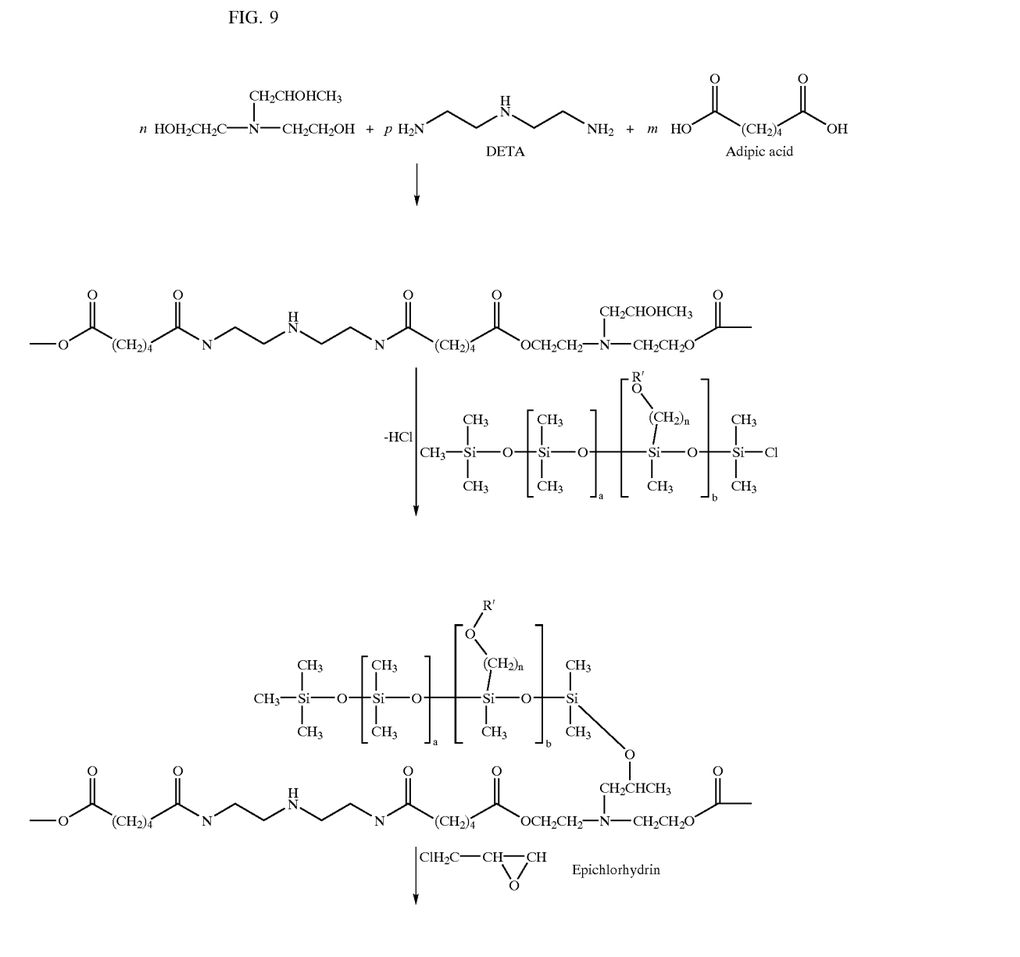

It is also possible to build a polysiloxane chain onto an existing functionalized polyamide backbone. Two specific examples are shown in FIGS. 8 and 9. FIG. 9 involves the concept of specifically incorporating a co-monomer into the polymer backbone which is capable of being reacted upon by a material of structure of FIG. 7. This type of synthesis lends itself well to incorporation of the siloxane moieties prior to the epichlorohydrin reaction.

FIG. 8

R' = —(CH$_2$CH$_2$O)$_n$(CH$_2$CHO)$_m$CH$_3$
       CH$_3$
where a, b = 1–1000, n ≥ 2, and m, p ≥ 1

FIG. 9

-continued

R' = —(CH$_2$CH$_2$O)$_n$(CH$_2$CHO)$_m$CH$_3$ where a, b=1–1000, n≧2, and m, p≧1

Block Copolymer Grafting

A third manner by which the polysiloxane may be introduced is via a mono or disubstituted copolymer containing linear or branched, substituted or unsubstituted, saturated or unsaturated hydrocarbon moieties. Finished polymers will be similar to the structure of FIG. 10.

Figure 10:
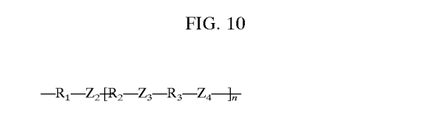

FIG. 10 where $Z_2$, $Z_3$, $Z_4$=bridging radicals including —OOC—, —COO—, —NHCO—, —OCNH—, —O—, —S—, CONHCO, —NCOO, —OSO2O—, —OCOO—, or any other suitable bridging radical. $Z_1$, $Z_2$, $Z_3$, $Z_4$ may be the same or different. The purpose of the $Z_1$, $Z_2$, $Z_3$, $Z_4$ radical is to serve as a mechanism for incorporating the $R_1$, $R_2$, and $R_3$ groups into the polymer. The $Z_1$ groups may also contain aryl functionality.

$R_1$=polysiloxane moiety, linear or branched or cyclic, substituted or non-substituted $R_2$=any linear or branched, saturated or unsaturated, substituted or non-substituted aliphatic hydrocarbon containing at least one secondary amine group. In addition said polymer shall have a portion of its secondary amine groups reacted in such a manner as to render the polymer substantive to cellulose through one or more of the following mechanisms:
1. Intermolecular covalent bonding with cellulose
2. Intramolecular covalent bonding within the polymer molecule itself
3. Cationic charge development

Preferred functional groups for covalent bonding include azetidinium, epoxy, silanol and mixtures of said groups.

$R_3$=any linear or branched, saturated or unsaturated, substituted or non-substituted aliphatic hydrocarbon.

It will be appreciated that the foregoing examples, given for purposes of illustration, shall not be construed as limiting the scope of this invention, which is defined by the following claims and all equivalents thereto.

We claim:

1. A condensation polymer having a backbone with the following structure:

where w≧1 q>0 m≧1 n≧1 p≧0

$Z_1$, $Z_2$, $Z_3$= bridging radicals, which may be the same or different and which serve to incorporate the $R_1$, $R_2$, and $R_3$ groups into the polymer;

$R_1$= a monomer unit or a block or graft copolymer containing a siloxane fuctionality and of the form —O—Si(R')$_2$—O—[Si(R")$_2$—O]$_n$—Si(R''')$_3$ where R', R", R'" can be the same or different and are selected from the group consisting of: H, OH and aryl or alkyl or aliphatic hydrocarbon, C$_{1-40}$, linear or branched, saturated or unsaturated, substituted or non-substituted, with or without ethyoxylation and/or propoxylation;

$R_2$=any linear or branched, saturated or unsaturated, substituted or non-substituted aliphatic hydrocarbon containing at least one secondary amine group;

$R_3$=any linear or branched, saturated or unsaturated, substituted or non-substituted aliphatic hydrocarbon of chain length 2 or higher.

2. The polymer of claim 1 wherein the bridging radicals are selected from the group consisting of —OOC—, —COO—, —NHCO—, —OCNH—, —O—, —S—, CONHCO, —NCOO, —OSO2O—, —OCOO— and —OOC—Ar—O—.

3. The polymer of claim 1 wherein $R_2$ has the general structure:

where:

$R^4$, $R^5$ are linear or branched, substituted or non-substituted, saturated or unsaturated C$_{2-22}$ aliphatic hydrocarbons;

$Z^5 = NH$, or mixtures thereof.

4. The polymer of claim 1 wherein the monomer used to incorporate the $R_2$ into the backbone is selected from the group consisting of:

$NH_2CH_2CH_2NHCH_2CH_2NH_2$,
$HOOCCH_2NHCH_2COOH$,
$HOCH_2CH_2NHCH_2CH_2OH$,
$NH_2CH_2CH_2NHCH_2CH_2OH$,
$HOOCCH_2CH_2NHCH_2CH_2COOH$,
$NH_2CH_2CH_2NHCH_2CH_2NHCH_2CH_2NH$,
$NH_2(CH_2)_xNH(CH_2)_yNH_2$, and
$HN(CH_2CH_2CN)_2$ (where x=1 to 22 and y=1 to 22.

5. The polymer of claim 1 wherein the $R_3$ is incorporated into the backbone of the condensation polymer via a monomer selected from the group consisting of alkyl diamines, alkyl diacids and alkyl diacid derivatives having the following structure:

$$Z^1\text{—}R^4\text{—}Z^2$$

wherein:

$Z^1$, $Z^2$ are independently —$NH_2$, —COOH or —$COR^5$;
$R^5$=—$OCH_3$, $OCH_2CH_3$, —$OC_{1-4}$ alkyl or halo; and
$R^4$=a hydrocarbon radical containing a $C_{2-22}$ or higher, linear or branched, substituted or non-substituted aliphatic hydrocarbon.

6. The polymer of claim 1 further comprising one or more of the following groups attached to the backbone of the polymer:

where:

$R^1$, $R^2$ independently H or $CH_3$;
$Z^6$, $Z^7$ =bridging radicals, which can be the same or different, which serve to incorporate the group(s) into the polymer backbone;
a,b,c≧0;
a+b+c≧1;and
x=2 to 6.

7. The polymer of claim 6 wherein $Z^6$, $Z^7$ are selected from the group consisting of —OOC—, —COO—, —NHCO—, —OCNH—, —O—, —S—, CONHCO, —NCOO, —OSO2O—, —OCOO—, and —OOC—Ar—O—.

8. The polymer of claim 6 wherein the polyoxyalkylene oxide group is incorporated into the condensation polymer via a polyalkylene oxide monomer of structure:

where:

$R^1$, $R^2$=independently H or $CH_3$;
$R^3$, $R^4$=independently OH, $NH_2$, —$OCH_2COOH$ or —$OCH_2COOCH_3$;
a, b,c≧0;
a+b+c≧1; and
x=2 to 6.

* * * * *